US012240460B2

(12) United States Patent
Sussek

(10) Patent No.: US 12,240,460 B2
(45) Date of Patent: Mar. 4, 2025

(54) METHOD AND CONTROL UNIT FOR THE SATELLITE-BASED LOCALIZATION OF A VEHICLE IN A MAP-BASED REFERENCE SYSTEM

(71) Applicant: Robert Bosch GmbH, Stuttgart (DE)

(72) Inventor: Ullrich Sussek, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 233 days.

(21) Appl. No.: 18/046,008

(22) Filed: Oct. 12, 2022

(65) Prior Publication Data
US 2023/0118458 A1 Apr. 20, 2023

(30) Foreign Application Priority Data
Oct. 18, 2021 (DE) ..................... 10 2021 211 727.9

(51) Int. Cl.
*B60W 30/18* (2012.01)
*B60W 40/105* (2012.01)
*B60W 50/02* (2012.01)

(52) U.S. Cl.
CPC ........ *B60W 30/181* (2013.01); *B60W 40/105* (2013.01); *B60W 50/0205* (2013.01); *B60W 2520/14* (2013.01)

(58) Field of Classification Search
CPC ............. B60W 30/181; B60W 40/105; B60W 50/0205; B60W 2520/14; B60W 2520/10; B60W 2556/50; B60W 60/001; G01C 21/3407
See application file for complete search history.

(56) References Cited

U.S. PATENT DOCUMENTS

| 2010/0253602 A1* | 10/2010 | Szczerba | G06V 20/588 345/8 |
| 2011/0113609 A1* | 5/2011 | Berdelle-Hilge | H01M 50/249 29/762 |
| 2012/0275271 A1* | 11/2012 | Claussen | G01S 3/8006 367/118 |

(Continued)

FOREIGN PATENT DOCUMENTS

| DE | 10259851 A1 | 7/2004 |
| DE | 102015003124 A1 | 9/2016 |
| WO | WO-2016142030 A1 * | 9/2016 |

*Primary Examiner* — Donald J Wallace
*Assistant Examiner* — Jalal C Coduroglu
(74) *Attorney, Agent, or Firm* — Norton Rose Fulbright US LLP

(57) ABSTRACT

A method for the satellite-based localization of a vehicle in a map-based reference system. A trajectory in a map-based reference system is determined at regular time intervals, on which trajectory the vehicle is to be brought to a stop at least partially automatically in a defined emergency, and are stored in a circular buffer. In the defined emergency and in the event of failure of the at least one camera used for the full localization, an emergency trajectory is selected from the trajectories stored in the circular buffer. An initial vehicle position in the map-based reference system is determined based on the emergency trajectory. A vehicle orientation is ascertained based on a continuously acquired yaw rate of the vehicle. The stretch of route traveled by the vehicle is ascertained based on position data of the vehicle that are acquired in a satellite-based manner.

11 Claims, 3 Drawing Sheets

(56) References Cited

U.S. PATENT DOCUMENTS

| | | | |
|---|---|---|---|
| 2012/0330527 A1* | 12/2012 | Kumabe | B60W 40/04 |
| | | | 701/96 |
| 2015/0336607 A1* | 11/2015 | Inoue | B60W 30/10 |
| | | | 701/41 |
| 2016/0116343 A1* | 4/2016 | Dixon | G05B 15/02 |
| | | | 250/342 |
| 2020/0111363 A1* | 4/2020 | Maeda | G08G 1/0145 |
| 2020/0309541 A1* | 10/2020 | Lavy | G06V 20/588 |
| 2021/0133474 A1* | 5/2021 | Sawada | G06N 3/045 |
| 2022/0044133 A1* | 2/2022 | Otto | G06N 5/04 |
| 2023/0260552 A1* | 8/2023 | Bose | H04N 7/188 |
| | | | 463/31 |

* cited by examiner

METHOD AND CONTROL UNIT FOR THE SATELLITE-BASED LOCALIZATION OF A VEHICLE IN A MAP-BASED REFERENCE SYSTEM

CROSS REFERENCE

The present application claims the benefit under 35 U.S.C. § 119 of German Patent Application No. DE 10 2021 211 727.9 filed on Oct. 18, 2021, which is expressly incorporated herein by reference in its entirety.

FIELD

The present invention relates to a method and a control unit for the satellite-based localization of a vehicle in a map-based reference system.

BACKGROUND INFORMATION

The method according to the present invention is designed in particular for vehicles having a driver assistance system and driving in a fully or partially automated manner, and is intended to be used in the context of what is called a regression path function. The regression path function serves to bring the vehicle to a stop on a previously determined emergency trajectory in a defined emergency, in particular in the event of total or partial failure of the driver assistance system. As a rule, the goal is for the vehicle to come to a stop in the middle region of a roadway. To implement the regression path function, during the journey at regular time intervals, for example every 40 ms, trajectories are determined as possible emergency trajectories, namely in a map-based reference system. Accordingly, the determination of these trajectories is based on a camera-assisted full localization of the vehicle in this map-based reference system. To this end, for example a front-facing camera can be used which measures the lane markings of the roadway or alternatively other geographic identification points so that they can be matched with stored map information. Furthermore, current movement parameters of the vehicle, such as speed, acceleration, and orientation, additionally have some influence on determining the trajectories. The trajectories are stored in a circular buffer, so that the oldest trajectory in each case is overwritten by the trajectory newly determined in each case.

When a defined emergency occurs, one of the stored trajectories is selected as the emergency trajectory for actuating the braking system and/or the steering system of the vehicle. This may be the last, i.e. the most recent, stored trajectory. As a rule, however, an older trajectory is selected as the emergency trajectory, in order, by waiting a preset process safety time between the generating of the emergency trajectory and the triggering of the regression path function, to ensure that the emergency trajectory has still been determined without errors.

The vehicle position in the map-based reference system must be determined for driving along the emergency trajectory once the regression path function has been triggered. This proves problematic when the at least one camera used for the full localization likewise fails and the localization of the vehicle takes place exclusively in a satellite-based manner, i.e. for example exclusively on the basis of GPS data, which is referred to as blind localization. For the position data of a blind localization of this kind differ as a rule from the position data of a full localization because the two reference systems—map-based and satellite-based—are skewed or at least offset relative to each other. The resultant offset, in the event that both the driver assistance system and the camera used for the full localization fail and the regression path function is triggered, has to be compensated in order to avoid the vehicle deviating too far from the map-based emergency trajectory and in so doing crossing a roadway delimiter, in particular a lateral roadway delimiter.

Conventionally, in order to compensate for the offset between full localization and blind localization, to determine the skew angle $\Psi_{ML}$ of the two reference systems. To this end, during the journey, for successive time intervals $\Delta t$, a full localization and in parallel to this a blind localization of the vehicle are carried out, with the X-positions $X_{full}$ and $X_{blind}$ and the Y-positions $Y_{full}$ and $Y_{blind}$ of the vehicle being determined in each case. Then a skew angle $\Psi_{ML}$ is determined for each time interval $\Delta t$, by using the relationship $$Y_{full} = (\sin \Psi_{ML} \times X_{blind} + \cos \Psi_{ML} \times Y_{blind})$$

as a basis. In order to ascertain the skew angle $\Psi_{ML}$ with the necessary accuracy in this way, a relatively long observation time $\Delta t$ in the region of at least 2 s is necessary. Accordingly, the value for the skew angle $\Psi_{ML}$ is updated only relatively infrequently. It has however been shown that the skew angle $\Psi_{ML}$ is subject to great fluctuations during travel, and therefore a value that is 2 s old as a rule does not guarantee sufficient compensation of the offset between full localization and blind localization.

SUMMARY

With the aid of the measures according to the present invention, a simple satellite-based localization of a vehicle in a map-based reference system is to be made possible, namely in particular when the regression path function is triggered and the camera used for the full localization also fails. The measures according to the present invention in this case should enable very good satellite-based localization of the vehicle in relation to an emergency trajectory in a map-based reference system.

This may be achieved according to an example embodiment of the present invention in that, if the defined emergency occurs and the at least one camera used for the full localization fails,
  a. an emergency trajectory is selected from the trajectories stored in the circular buffer,
  b. an initial vehicle position in the map-based reference system is determined on the basis of the emergency trajectory,
  c. a vehicle orientation is ascertained on the basis of a continuously acquired yaw rate of the vehicle, and
  d. the stretch of route traveled by the vehicle is ascertained on the basis of position data of the vehicle that are acquired in a satellite-based manner.

The current vehicle position in each case in the map-based reference system is accordingly therefore ascertained by determining the vehicle trajectory by coupled navigation.

The initial offset is compensated by the trajectory being processed using the full localization until the emergency occurs. If the emergency occurs, then (once the camera has failed) this is continued with the blind localization (or coupled navigation).

As a result, an initial offset or initial skewing of the map-based reference system relative to the satellite-based reference system is very largely compensated. According to the present invention, in this case the information on the yaw rate of the vehicle that is present anyway is utilized, since a vehicle as a rule is even equipped with a plurality of angular rate sensors. Thus information on the yaw rate for example of safety systems or alternatively of the navigation system of a vehicle is used. Information on the current vehicle orientation in the form of a yaw angle can be obtained simply by temporal integration of the yaw rate. Furthermore, according to the present invention the ability of information on the vehicle speed to be derived from the position data acquired in a satellite-based manner is utilized. The stretch of route of the vehicle that is traveled can then be ascertained simply by temporal integration of the vehicle speed.

The offset between the full localization and the blind localization of the vehicle is frequently not exclusively attributed to the initial offset or the initial skewing between the map-based reference system and the satellite-based reference system. The offset between full localization and blind localization frequently also comprises a component individual to the trajectory. This offset individual to the trajectory or the skewing individual to the trajectory is attributed to the deformation of the vehicle trajectory on bends, and depends very greatly on the respective curvature and curved form of the current vehicle trajectory.

One advantageous development of the method according to the present invention takes account of this offset individual to the trajectory in that during the journey a mean deviation between a full localization and a blind localization of the vehicle that is dependent on the current vehicle trajectory is continuously determined, updated and stored. In this way, the offset individual to the trajectory or the skewing individual to the trajectory in the form of the last-determined mean deviation may be taken into account if the current vehicle position in the map-based reference system has to be ascertained in the event of failure of the driver assistance system and of the at least one camera used for the full localization. To this end, the stored mean deviation can simply be added in a weighted or unweighted manner as an angular deviation to the currently ascertained yaw angle of the vehicle.

The offset individual to the trajectory is determined in parallel with the generation and storage of the trajectories in the circular buffer, in that a mean deviation between the full localization of the vehicle and a blind localization of the vehicle is determined for the trajectories stored in the circular buffer. Since these trajectories represent the current course of the route of the vehicle, and in each case only a portion that corresponds to a defined time interval, for example 600 ms, in this way rapid, short-term changes in the course of the route can also be taken into account.

According to an example embodiment of the present invention, it is provided to determine an offset individual to the trajectory in the form of a mean deviation by first of all determining a deviation between a full localization and a blind localization of the vehicle for each trajectory stored in the circular buffer.

To this end, a starting time is preset at which both the full localization and a blind localization are started. This starting time is set in relation to the time interval of the trajectory, i.e. for example at the start of this time interval or once a certain tolerance time after the start of the time interval has run out. Whereas the full localization is camera-assisted, and uses a multiplicity of items of sensor information and possibly also satellite-based information together with stored map information, the blind localization is based exclusively on satellite-based position data. It is particularly advantageous if the blind localization in the map-based reference system is based on coupled navigation. The current vehicle position can then be determined simply starting from the vehicle position data of the full localization at the starting time and using vehicle orientation and the vehicle speed, the vehicle orientation being determined on the basis of the yaw rate, and the vehicle speed being ascertained on the basis of the position data acquired in a satellite-based manner. After a preset duration, at the latest if the trajectory is erased from the circular buffer, then the deviation between the full localization and the blind localization is ascertained.

Finally, a mean deviation is determined from the deviations ascertained for the individual trajectories as the offset individual to the trajectory, i.e. as an offset or skewing between full localization and blind localization that can be attributed to the current individual course of the route.

In principle, there are various possible ways of determining a mean deviation from the deviations determined for the individual trajectories in the context of the present invention. It proves advantageous here to use a mean value filter with a forget factor, in order also to take account of rapid, short-term variations in the section of route. Advantageously, the stored mean deviation is updated until the regression path function is activated. Thus it can be ensured that an offset individual to the trajectory, or a skewing individual to the trajectory, that corresponds as well as possible to the current course of the route is taken into account.

The method according to the present invention can advantageously be implemented with the aid of a control unit for a vehicle driving in an at least partially automated manner that is designed to at least partially implement a regression path function with which the vehicle in a defined emergency is brought to a stop on a trajectory predetermined in a map-based reference system. To this end, the control unit according to an example embodiment of the present invention has access

- to a circular buffer for trajectories in the map-based reference system,
- to sensor data of at least one yaw rate sensor of the vehicle, and
- to position data of a satellite-based blind localization of the vehicle.

Furthermore, the control unit according to an example embodiment of the present invention is designed, in the defined emergency and in the event of failure of at least one camera used for the full localization, to determine the current vehicle position in each case in the map-based reference system, in that a. an emergency trajectory is selected from the trajectories stored in the circular buffer,
b. an initial vehicle position in the map-based reference system is determined on the basis of the emergency trajectory,
c. a vehicle orientation is ascertained on the basis of the sensor data of the yaw rate sensor, and
d. the stretch of route traveled by the vehicle is ascertained on the basis of position data of the vehicle that are acquired in a satellite-based manner.

In one particularly advantageous embodiment of the present invention, the control unit according to the present invention is furthermore designed, for the trajectories temporarily stored in the circular buffer, to determine and store a mean deviation between the full localization and the blind localization of the vehicle, and/or to access a stored mean deviation, in order to take into account the stored mean deviation if the current vehicle position is determined in the defined emergency and in the event of failure of the at least one camera used for the full localization.

The functionality of a control unit according to the present invention specified above could advantageously be implemented in the braking and/or steering control system of a vehicle driving in an at least partially automated manner.

BRIEF DESCRIPTION OF THE DRAWINGS

Advantageous specific embodiments and developments of the present invention will be discussed below with reference to the figures.

DETAILED DESCRIPTION OF EXAMPLE EMBODIMENTS

Figure 1:
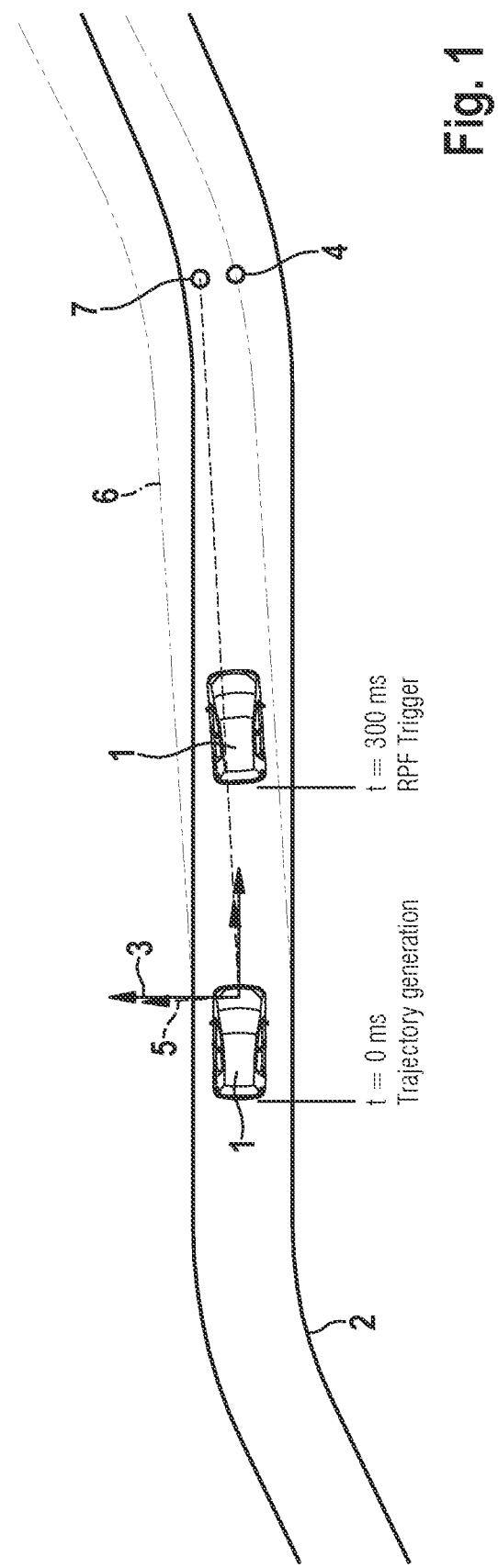
FIG. 1 illustrates the regression path function of a vehicle driving in an at least partially automated manner for the case of full localization of the vehicle and for the case of blind localization of the vehicle.

As explained above, the present invention in question here is used in particular in conjunction with the regression path function of a vehicle driving in an at least partially automated manner. FIG. 1 serves to illustrate the underlying problems. To this end, here a vehicle 1 driving in an automated manner is illustrated at two successive times, t1=0 ms and t2=300 ms. The vehicle 1 is moving along a traffic lane 2. In normal operation, the driver assistance system of the vehicle 1 at regular time intervals, here every 40 ms, generates a trajectory as a possible emergency trajectory and stores it in a circular buffer. The calculation of these trajectories is based on a camera-assisted full localization of the vehicle 1 at the respective calculation time. The trajectories are therefore determined in a map-based reference system that is symbolized here by the coordinate system 3. In this case, for example the lane markings of the traffic lane 2 that are acquired by a front-facing camera are matched with stored map information and the course of the traffic lane 2 that is available as map information is taken into account. Thus for example the trajectory calculated at the time t1 lies in the region of the traffic lane 2, and ideally in the middle region of the traffic lane 2. Accordingly, the ideal stopping point 4 also lies in the middle of the traffic lane 2. 5 designates the coordinate system of a purely satellite-based reference system, in which a blind localization of the vehicle 1 takes place if a full localization is not possible. This coordinate system 5 is skewed relative to the coordinate system 3 of the map-based reference system. This yields an offset between the traffic lane 2 and a travel envelope region 6 that is produced for driving on the trajectory calculated at the time t1 if the current vehicle position is determined exclusively by blind localization and is not corrected. In this case, the vehicle 1 comes to a stop at a stopping point 7 that is distinctly offset relative to the ideal stopping point 4, and one corresponding to the reciprocal skewing of the two coordinate systems 3 and 5.

Furthermore, FIG. 1 illustrates that upon the regression path function being triggered, here at the time t2, as a rule a trajectory generated at an earlier time is selected as the emergency trajectory, here the trajectory calculated at the time t1. This is intended to ensure that the emergency trajectory has still been calculated without errors by the driver assistance system. The time interval between the triggering of the regression path function and the calculation time of the selected emergency trajectory is referred to as the process safety time.

Figure 2:
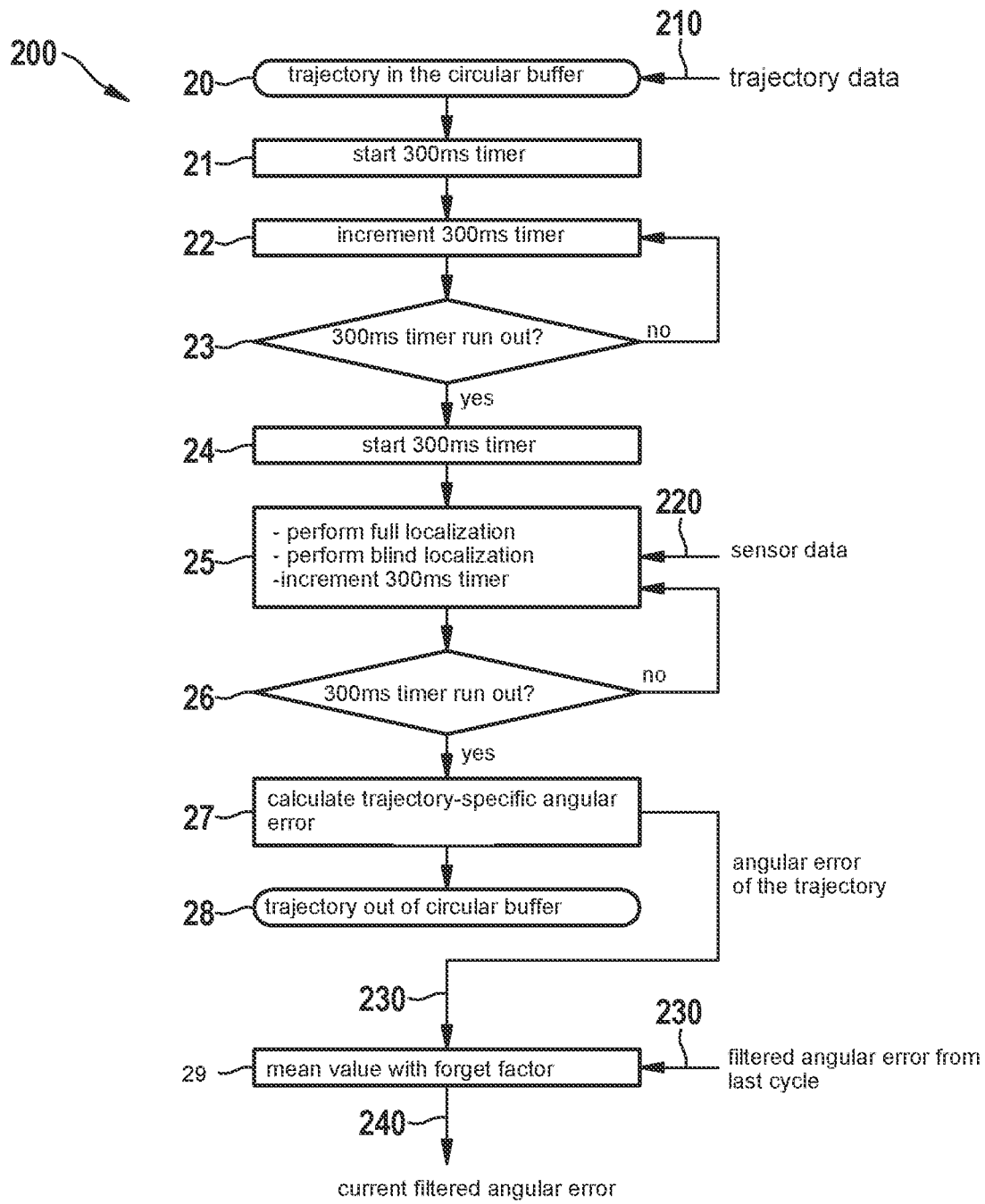
FIG. 2 explains the method steps of an advantageous variant of the method according to the present invention that are performed during proper operation of the driver assistance system during travel of a vehicle driving in an at least partially automated manner, with the aid of a flow diagram 200.

The flow diagram 200 of FIG. 2 illustrates what measures are taken during the proper driving operation of a vehicle driving in an automated manner in order to implement an advantageous embodiment of the method according to the present invention.

In normal driving mode, a trajectory on which the vehicle is to be at least partially automatically brought to a stop in a defined emergency, in particular if failure or malfunction of the driver assistance system occurs, is determined at regular time intervals, for example every 40 ms. Each of these trajectories is ascertained on the basis of the current vehicle position in each case, further vehicle status data, such as speed, acceleration, and orientation, as well as map information. The current vehicle position is determined with the aid of at least one camera, possibly further sensors, possibly also with satellite assistance and using map information, which is referred to as full localization. Each trajectory 210 thus ascertained in step 20 is stored in a circular buffer, and in such a way that the oldest trajectory in each case is overwritten by the trajectory 210 newly determined in each case. Each trajectory in the embodiment described here covers a driving time of 600 ms, calculated from the time of generation of the trajectory. Accordingly, each trajectory is erased from the circular buffer again after 600 ms.

Corresponding to a preferred embodiment of the method according to the present invention, a mean deviation 240 between the full localization of the vehicle and a satellite-based blind localization of the vehicle that is dependent on the current vehicle trajectory is determined and stored on the basis of the trajectories stored in the circular buffer.

To this end, in step 21 a first timer is started, in order at a defined starting time, here 300 ms after the time of generation of the trajectory 210, i.e. once a process safety time has run out, to start a full localization of the vehicle and in parallel to this a blind localization of the vehicle. In step 22, the first timer is incremented until the query in step 23 shows that the first timer has run out. Then in step 24 a second timer is started that is intended to limit the duration of the full localization and blind localization that are running in parallel until the trajectory runs out after 600 ms. In step 25, the second timer is incremented accordingly. Furthermore, the full localization and the blind localization are started, for which purpose the necessary sensor data 220 are retrieved. In the blind localization, the current vehicle position in the map-based reference system is ascertained by coupled navigation. The vehicle position data of the full localization at the starting time are used as the starting point. Furthermore, the sensor data of at least one angular rate sensor are used in order to determine the vehicle orientation, and the position data acquired in a satellite-based manner that supply information on the vehicle speed.

Step 25 is repeated until the query in step 26 shows that the second timer and hence also the trajectory 210 have run out. In step 27, then a trajectory-specific deviation is ascertained as an angular error or angular deviation 230 from the offset between the full localization and the blind localization and temporarily stored. In step 28, the trajectory 210 is finally erased from the circular buffer.

The method steps 20 through 28 described above are run through for each trajectory stored in the circular buffer, and accordingly a trajectory-specific angular deviation 230 is determined and temporarily stored for each of these trajectories. From these, a mean deviation or a mean angular deviation 240 is then ascertained in a further method step 29. Advantageously, in such case a mean value filter with a forget factor is used, so that the mean angular deviation 240 currently determined in each case takes account of the current curved course of the section of route.

Figure 3:
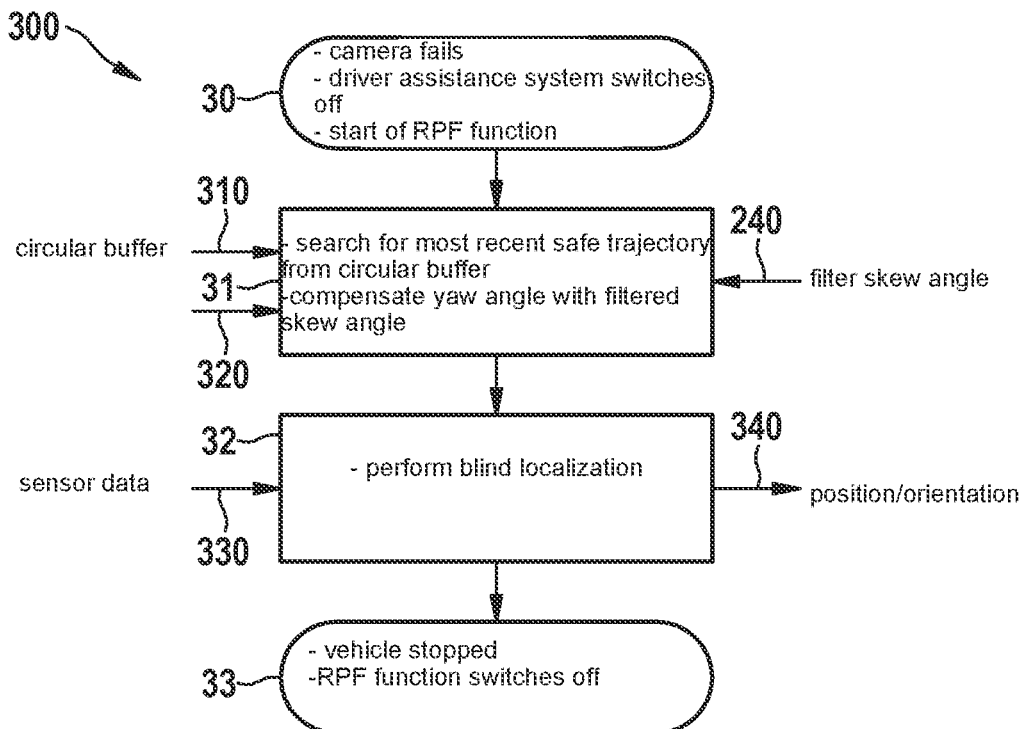
FIG. 3 shows a flow diagram 300 with the method steps of this variant of the method according to the present invention that are performed in the event of failure of the driver assistance system and of the camera used for the full localization.

The mean angular deviation 240 is advantageously stored and updated until the regression path function is activated. This case will be discussed in greater detail below in conjunction with FIG. 3.

In the embodiment described here, the regression path function is activated if the driver assistance system fails and also the functioning of the camera used for the full localization is impaired. This is referred to here as a defined emergency, and is the starting situation of the flow diagram 300—step 30. In order now to bring the vehicle safely to a stop, in step 31 first of all the most recent safe trajectory 310 stored in the circular buffer is selected as the emergency trajectory. In the embodiment described here, to this end it is not the last trajectory stored that is selected as the emergency trajectory, since it cannot be ensured that it has still been generated without errors. To make sure that the trajectory 310 selected as the emergency trajectory was ascertained when the driver assistance system and camera were fully operational, a process safety time of 300 ms is maintained and therefore the trajectory that is 300 ms old is selected as the emergency trajectory 310. From this emergency trajectory 310, which is based on a full localization of the vehicle at the time of generation of the trajectory, the initial vehicle position in the map-based reference system is derived upon activation of the regression path function. Furthermore, in step 31 the sensor data 320 of at least one angular rate sensor or yaw rate sensor is continuously integrated, in order to ascertain the current yaw angle of the vehicle in each case, i.e. the current vehicle orientation in each case. The initial yaw angle thus ascertained at the time of activation of the regression path function is then additionally corrected by adding the previously ascertained mean angular deviation 240. This takes account of the current curved course of the section of route.

The current vehicle position 340 in each case in step 32 is then ascertained in a satellite-based manner by blind localization by coupled navigation. The starting point for this is formed by the previously determined initial vehicle position with the aid of the emergency trajectory, together with the corrected initial yaw angle. Information on the vehicle speed is supplied by the position data 330 obtained in a satellite-based manner, i.e. for example GPS data. The vehicle trajectory thus ascertained is then compared with the emergency trajectory in order to generate suitable control signals for the braking and steering system of the vehicle until the vehicle in step 33 has come to a stop and the regression path function is deactivated.

Figure 4:
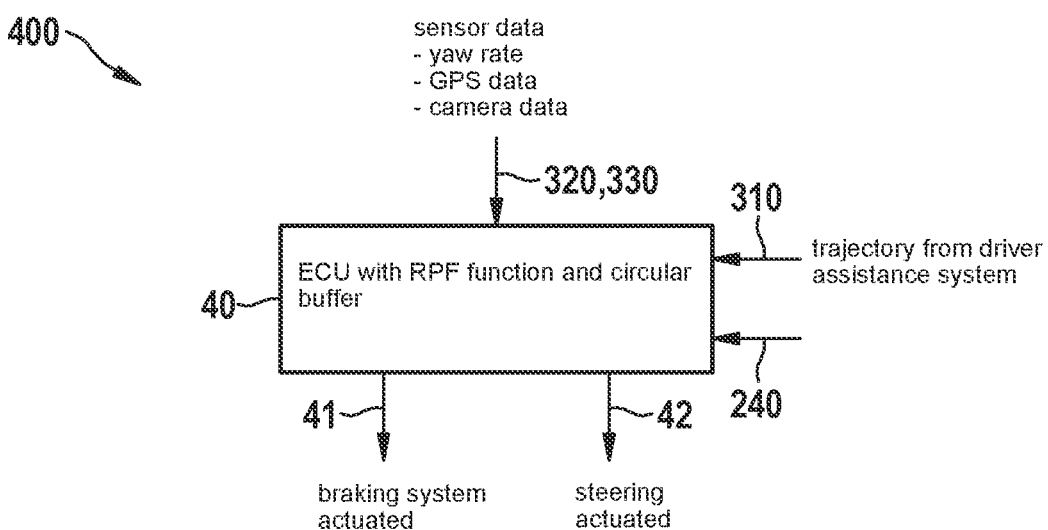
FIG. 4 shows a block diagram 400 of a control unit according to an example embodiment of the present invention.

The regression path function described above can advantageously be implemented in a control unit for a vehicle driving in an at least partially automated manner, which is illustrated by the block diagram 400 of FIG. 4. Accordingly, the control unit 40 has access to the circular buffer, in which the trajectories generated during normal driving mode are stored, so that in the defined emergency it can select a trajectory as the emergency trajectory 310 and read it out from the circular buffer. Furthermore, the control unit 40 described here has access to a memory in which the previously determined mean angular deviation 240 is filed. Finally, the control unit 40 also has access to the sensor data 320 of at least one yaw rate sensor of the vehicle and to satellite-based position data 330 for a blind localization of the vehicle. To implement the regression path function, the control unit 40 must furthermore be designed to recognize the defined emergency and then, in the event of failure of the camera used for the full localization, to determine the current vehicle position in the map-based reference system in each case in accordance with the method previously described, compare it with the emergency trajectory and generate corresponding control signals 41 and 42 for the braking system and the steering system.

What is claimed is:

1. A method for a satellite-based localization of a vehicle in a map-based reference system, the method comprising:
   determining a trajectory in the map-based reference system being determined at regular time intervals, the trajectory being a trajectory on which the vehicle is to be brought to a stop at least partially automatically in a defined emergency;
   storing the trajectories in a circular buffer, so that an oldest trajectory in each case is overwritten by the trajectory newly determined in each case;
   in the defined emergency and in the event of failure of at least one camera used for full localization, determining a current vehicle position in the map-based reference system by:
   a. selecting an emergency trajectory from the trajectories stored in the circular buffer,
   b. determining an initial vehicle position in the map-based reference system based on the selected emergency trajectory;
   c. ascertaining a vehicle orientation based on a continuously acquired yaw rate of the vehicle, and
   d. ascertaining a stretch of route traveled by the vehicle based on position data of the vehicle that are acquired in a satellite-based manner;
   wherein based on the trajectories stored in the circular buffer, a mean deviation, which is dependent on a current vehicle trajectory is determined between the full localization of the vehicle and a blind localization of the vehicle, the mean deviation is stored, and the stored mean deviation is taken into account when the current vehicle position in the defined emergency and in the event of failure of the at least one camera used for the full localization is ascertained.

2. The method as recited in claim 1, wherein the continuously acquired yaw rate is temporally integrated to ascertain a yaw angle of the vehicle.

3. The method as recited in claim 1, wherein a vehicle speed is ascertained based on the position data of the vehicle that are acquired in a satellite-based manner, and wherein the vehicle speed is temporally integrated to ascertain the stretch of route traveled by the vehicle.

4. The method as recited in claim 1, wherein, for each trajectory stored in the circular buffer:
   the full localization of the vehicle is started at a defined starting time,
   in parallel to the full location started at the defined time, a blind localization of the vehicle is started that ascertains the current vehicle position in the map-based reference system by coupled navigation based on:
   i. the current vehicle position data of the full localization at the starting time, ii. the vehicle orientation, and iii. a vehicle speed ascertained using the position data acquired in a satellite-based manner, and after a preset duration, at the latest, if the trajectory is erased from the circular buffer, a deviation between the full localization and the blind localization is ascertained, and wherein a mean deviation is determined from the deviations ascertained for the individual trajectories.

5. The method as recited in claim 4, wherein the full localization and the blind localization for determining the mean deviation are each started only after a presettable process safety time interval has run out, the process safety time interval beginning with a time at which the trajectory is stored in the circular buffer.

6. The method as recited in claim 1, wherein the mean deviation is determined using a mean value filter with a forget factor.

7. The method as recited in claim 1, wherein the stored mean deviation is updated until the defined emergency occurs and the at least one camera used for the full localization fails.

8. The method as recited in claim 1, wherein the continuously acquired yaw rate is temporally integrated to ascertain a yaw angle of the vehicle, and wherein the stored mean deviation is added in a weighted or unweighted manner as an angular deviation to the ascertained yaw angle of the vehicle.

9. A control apparatus for a vehicle driving in an at least partially automated manner, comprising:
- a control unit configured to at least partially implement a regression path function with which the vehicle in a defined emergency is brought to a stop on a trajectory predetermined in a map-based reference system;
- wherein the control unit has access to:
  - a circular buffer for trajectories in the map-based reference system,
  - sensor data of at least one yaw rate sensor of the vehicle, and
  - position data of a satellite-based blind localization of the vehicle,
- wherein the control unit is configured, in the defined emergency and in the event of failure of at least one camera used for a full localization, to determine a current vehicle position in the map-based reference system, by:
  - a. selecting an emergency trajectory from the trajectories stored in the circular buffer,
  - b. determining an initial vehicle position in the map-based reference system based on the emergency trajectory,
  - c. ascertaining a vehicle orientation based on the sensor data of the yaw rate sensor, and
  - d. ascertaining a stretch of route traveled by the vehicle based on position data of the vehicle that are acquired in a satellite-based manner;
- wherein based on the trajectories stored in the circular buffer, a mean deviation, which is dependent on a current vehicle trajectory is determined between the full localization of the vehicle and a blind localization of the vehicle, the mean deviation is stored, and the stored mean deviation is taken into account when the current vehicle position in the defined emergency and in the event of failure of the at least one camera used for the full localization is ascertained.

10. A method for a satellite-based localization of a vehicle in a map-based reference system, the method comprising:
- determining a trajectory in the map-based reference system being determined at regular time intervals, the trajectory being a trajectory on which the vehicle is to be brought to a stop at least partially automatically in a defined emergency;
- storing the trajectories in a circular buffer, so that an oldest trajectory in each case is overwritten by the trajectory newly determined in each case;
- in the defined emergency and in the event of failure of at least one camera used for full localization, determining a current vehicle position in the map-based reference system by:
  - a. selecting an emergency trajectory from the trajectories stored in the circular buffer,
  - b. determining an initial vehicle position in the map-based reference system based on the selected emergency trajectory;
  - c. ascertaining a vehicle orientation based on a continuously acquired yaw rate of the vehicle, and
  - d. ascertaining a stretch of route traveled by the vehicle based on position data of the vehicle that are acquired in a satellite-based manner;
  - wherein a vehicle speed is temporally integrated to ascertain the stretch of route traveled by the vehicle.

11. The method as recited in claim 10, wherein the vehicle speed is ascertained based on the position data of the vehicle that are acquired in a satellite-based manner.

* * * * *